United States Patent [19]

Takishima

[11] Patent Number: 5,078,471
[45] Date of Patent: Jan. 7, 1992

[54] OPTICAL HEAD
[75] Inventor: Suguru Takishima, Hoya, Japan
[73] Assignee: Asahi Kogaku Kogyo Kabushiki Kaisha, Tokyo, Japan
[21] Appl. No.: 588,012
[22] Filed: Sep. 25, 1990
[30] Foreign Application Priority Data
 Sep. 26, 1989 [JP] Japan .............................. 1-112922[U]
[51] Int. Cl.$^5$ .............................................. G02B 7/02
[52] U.S. Cl. ................................. 359/813; 369/44.16; 359/823
[58] Field of Search ............... 350/245, 247, 252, 255; 369/44.15, 44.16, 43, 52; 250/201.5

[56] References Cited
U.S. PATENT DOCUMENTS
4,799,766 1/1989 Estes .................................... 350/252
4,835,646 5/1989 Kurosawa et al. .
4,868,377 9/1989 Nishikawa .

FOREIGN PATENT DOCUMENTS
62-162241 7/1987 Japan .
63-214925 9/1988 Japan .

OTHER PUBLICATIONS
English abstract of Japanese Application No. 62-162,241.
English abstract of Japanese Application No. 63-214,925.

Primary Examiner—Loha Ben
Attorney, Agent, or Firm—Sandler, Greenblum & Bernstein

[57] ABSTRACT

A position detecting mechanism, adapted to be positioned in a device having an optical head arranged to be movable in tracking direction, for detecting the position of the optical head in the tracking direction. A pair of light transmitting members for transmitting light toward the optical head, reflecting plate, provided on the optical head extending along the tracking direction, for reflecting the light transmitted from the pair of light transmitting members at the edge portions thereof along the tacking direction, and a pair of light receiving members for receiving the light reflected by the reflecting plate and outputting signals corresponding to amounts of light received by the light receiving members are provided. The pair of light transmitting members and the pair of light receiving members are arranged in a row along a predetermined line in parallel to the tracking direction. Therefore, the position of the optical head along the tracking direction is not erroneously detected even when the reflecting plate is moved in the focusing direction.

7 Claims, 10 Drawing Sheets

OPTICAL HEAD

BACKGROUND OF THE INVENTION

This invention relates to an optical head which is employable in an optical disk device, an optical video-disk device, a compact-disk player and so on.

FIG. 1 shows a plane view showing a construction of a conventional optical head which is emplyable in an optical disk device. In the drawing, numeral 1 indicates a bobbin serving as a lens holder constructed to mount an objective lens 2 thereon. The bobbin 1 is arranged to be movable along a direction indicated by an arrow "A" as well as in a direction indicated by a pair of symbols "B1" and "B2" which is orthogonal to the "A" direction, i.e., perpendicular to a surface of a sheet on which the drawing is shown. Numeral 3 indicates a focusing coil wound around the outer surface of the bobbin 1, numerals 4A through 4D indicate tracking coils mounted on the focusing coil 3. Further, numerals 5, 5 indicates a wire suspension mechanism for supporting the bobbin 1. One pair of terminals of the wire suspension mechanism 5 is connected to an outer surface of the bobbin 1, while the other pair of terminals thereof is connected to a fixing member 6 which is fixed within a device in which the optical head is to be provided. Therefore, the bobbin 1 is supported by the wire suspension mechanism 5 and is moved in the "A" direction as well as "B1-B2" direction in accordance with deformation of wires comprising the wire suspension mechanism 5.

Numerals 7A through 7D respectively indicate permanent magnets mounted on fixing members 12A through 12D for generating a magnetic field. Thus, the focusing coil 3 and the tracking coils 4A through 4D are located in the magnetic field generated by the permanent magnets 7A through 7D. Numeral 8 indicates a reflecting plate for reflecting light transmitted from light transmitting elements included in a pair of optical sensors 9A and 9B, described later. The reflecting plate 8 is mounted on the bobbin 1, as shown in FIG. 1, on the opposite side surface from the surface on which the suspension mechanism 5 is connected. The reflecting plate 8 is arranged, for example, in such a manner that a surface of a metal, glass and so forth having been ground in advance, is evaporated by thin metal membrane. Further, a pair of optical sensors 9A and 9B are provided opposite the reflecting plate 8. Numeral 10 indicates a differential operational amplifier for outputting a signal in accordance with the difference between the outputs of the optical sensors 9A and 9B.

FIG. 2 shows an enlarged view of one of the optical sensors 9B. As shown in FIG. 2, the optical sensor 9B comprises a package 9B3 for accommodating a light transmitting element 9B1 such as a LED (Light Emitting Diode) and a light receiving element 9B2 such as a photodiode. Further, as shown in FIG. 3, the optical sensors 9A and 9B are arranged in a row along the "A" direction, and opposed to the reflecting plate 8. The optical sensor 9A like the optical sensor 9B, comprises a package 9A3 accommodating a light emitting element 9A1 and a light receiving element 9A2. As shown in FIG. 3, each of the pairs of the light transmitting and receiving elements, 9A1 and 9B1, 9A2 and 9B2, are separately located from each other in the "B1-B2" direction. The optical sensors 9A and 9B are mounted on a fixing unit, not shown, fixed within the device in which the optical head is to be provided. The light receiving elements 9A2 and 9B2 are arranged to be located on the outside of the reflecting plate 8 in the "A" direction, while the light transmitting elements 9A1 and 9B1 are located on the inside of the reflecting plate 8 as shown in FIG. 3. In other words, the light transmitted from the light transmitting elements 9A1 and 9B1 are respectively reflected at the both side edge portions of the reflecting plate 8 and received by the light receiving elements 9A2 and 9B2 as shown in FIG. 1.

In the above structured conventional optical head, when a signal caused by a moving error of the optical head along a focusing direction, i.e., in the "B1-B2" direction, is supplied to the focusing coil 3, moving force is generated along the "B1-B2" direction in accord with Fleming's left hand rule, since the focusing coil 3 is located in the magnetic field generated by the permanent magnets 7A through 7D. Accordingly, the wires of the suspension mechanism 5 are deformed, and then, the optical head can be moved along the "B1-B2" direction. On the other hand, when a signal caused by a moving error of the optical head along a tracking direction, i.e., in the "A" direction, is supplied to the tracking coils 4A through 4D, moving force is generated along the "A" direction in accord with the Fleming's left hand rule, and then, the optical head can be moved along the "A" direction. When the optical head is moved upwardly in the drawing of FIG. 1, the amount of light reflected by the reflecting plate 8 transmitted from the light transmitting element 9A1 is increased. Thus, the amount of light received by the light receiving element 9A2 is increased. In this case, received by the light receiving element 9B2 is decreased. On the contrary, when the optical head is moved downward in the drawing, the amount of light received by the light receiving element 9B2 is increased, and the amount of light received by the light receiving element 9A2 is decreased. Accordingly, by detecting the difference between the outputs "A" and "B", from these optical sensors which respectively correspond to the amounts of the received light, it becomes possible to determine the position of the optical head along the "A" direction, i.e., the tracking direction.

In the above conventional optical head, as shown in FIG. 3, since the pairs of elements 9A1, 9A2 and 9B1, 9B2 are deviated from each other in the "B1-B2" direction, the outputs "A" and "B" from the optical sensors 9A and 9B are erroneously varied when the optical head is moved in the "B1-B2" direction. In other words, when the optical head is moved upwardly in FIG. 3, the amount of light received by the light receiving element 9A2 is decreased. On the contrary, when the head is moved downwardly, the amount of light to be received by the light receiving element 9B2 is decreased. The above variation of light are erroneously detected as movement of the optical head in the "A" direction.

In order to solve the above problem, it can be arranged in such a manner that length of the reflecting plate 8 in the focusing direction is longer. However, this arrangement makes the total volume of the device larger, and the production cost higher.

SUMMARY OF THE INVENTION

It is therefore an object of the invention to provide an improved optical head arranged in such a manner that position along the tracking direction is accurately detected irrespective of movement along the focusing direction.

For this purpose, according to the present invention, there is provided a position detecting mechanism, adapted to be positioned in a device having a predetermined member arranged to be movable at least in one direction, for detecting the position of the predetermined member in the one direction, comprising a pair of light transmitting elements for transmitting light toward the predetermined member, a reflecting device, provided on the predetermined member extending along the one direction in a predetermined length, for reflecting the light transmitted from the pair of light transmitting elements at the edge portions thereof along the one direction, and a pair of light receiving elements for receiving the light reflected by the reflecting device and outputting signals corresponding to amounts of light received by the light receiving elements, the pair of transmitting elements and the pair of light receiving elements are arranged in a row along the one direction.

DESCRIPTION OF THE ACCOMPANYING DRAWINGS

DESCRIPTION OF THE EMBODIMENTS

Figure 1:
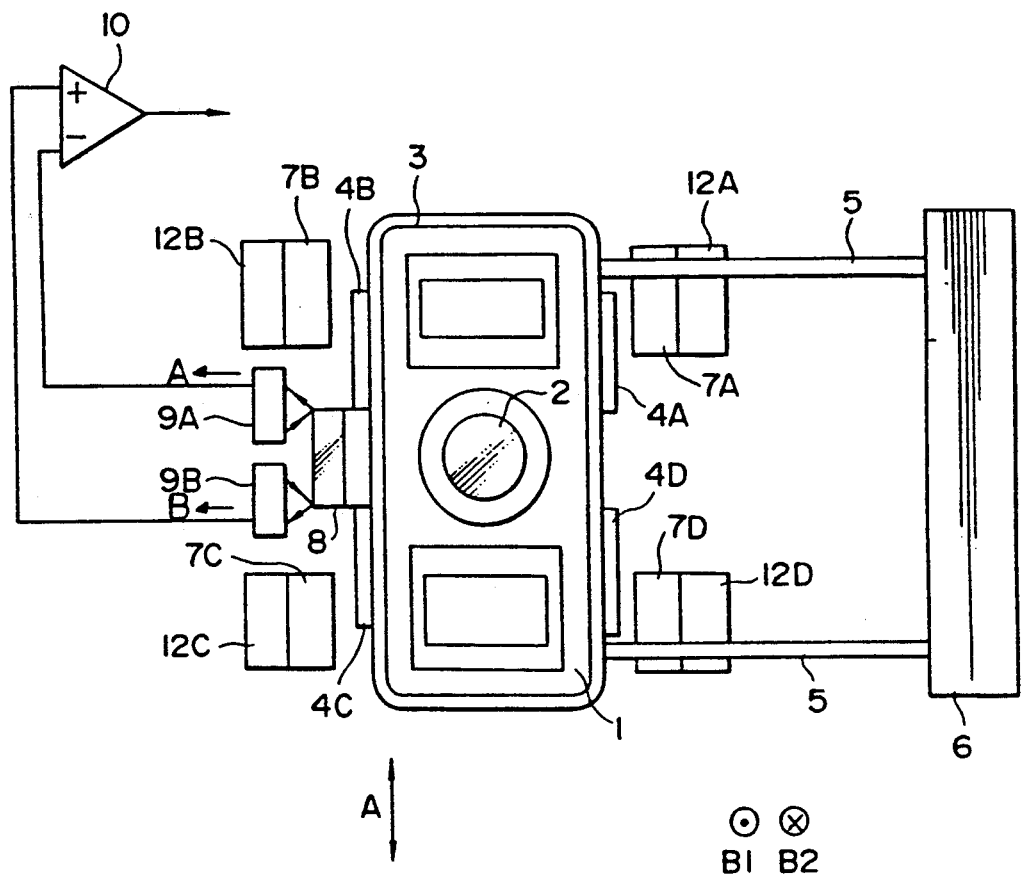
FIG. 1 is a plane view of a conventional optical head.
Figure 2:
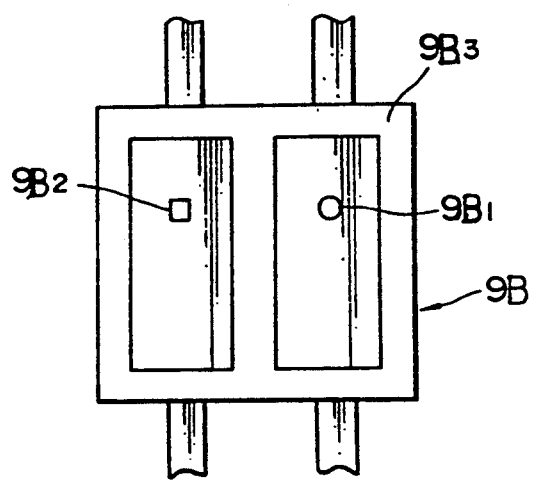
FIG. 2 is an enlarged view of an optical sensor for detecting the position of the optical head of FIG. 1 along a tracking direction.
Figure 3:
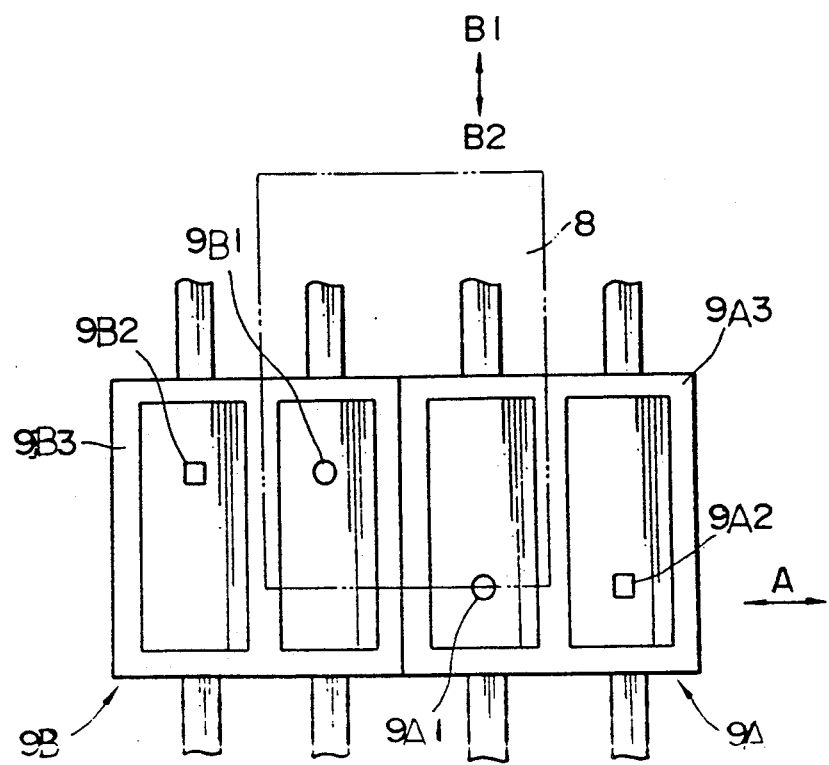
FIG. 3 is a view showing a positional relationship between a reflecting plate mounted on the optical head of FIG. 1 and the optical sensors when the position of the optical head along the tracking direction is detected.
Figure 4:
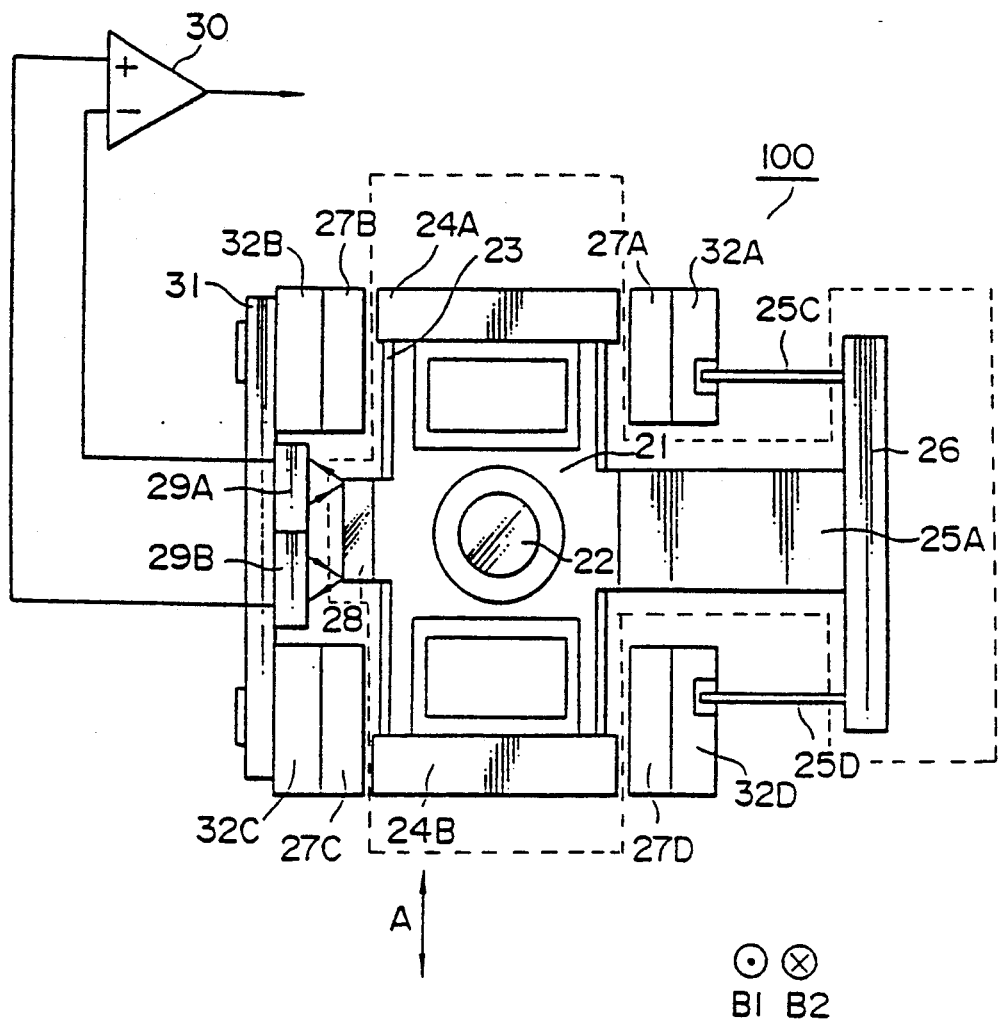
FIG. 4 is a plane view of an optical head according to the present invention.
Figure 5:
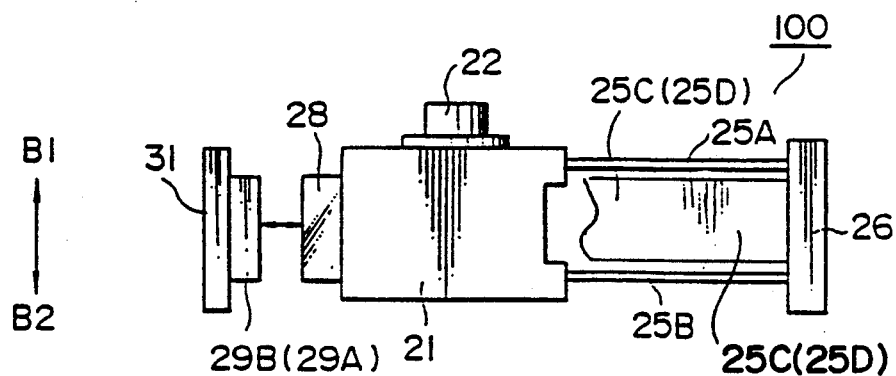
FIG. 5 is a side view of the optical head of FIG. 4.

FIG. 4 shows a plane view of an optical head 100 according to the present invention, and FIG. 5 is a side view of the optical head 100 of FIG. 4. In these drawings, a bobbin 21 is constructed to mount an objective lens 22 thereon. A focusing coil 23 is wound around an outer surface of the bobbin 21, numerals 24A and 24B indicate tracking coils mounted on the focusing coil 23. Numerals 25A and 25B indicate a pair of leaf springs whose one edge portions are respectively connected to an outer surface of the bobbin 21 and the other edge portions thereof are connected to a movable supporting member 26. The supporting member 26 is movable only in the tracking direction. Accordingly, the leaf springs 25A and 25B can be deformed in a direction in a direction indicated by symbols "B1" and "B2" about the supporting member 26, i.e., in a direction perpendicular to a surface of a sheet on which the drawing is shown. Numerals 25C and 25D indicate another pair of leaf springs whose one edge portions are connected to the supporting member 26 like the leaf springs 25A and 25B, and the other edge portions thereof are respectively connected to fixing members 32A and 32D fixedly provided within the device. Accordingly, the leaf springs 25C and 25D are arranged to be deformed in a direction indicated by an arrow "A".

Numerals 27A through 27D respectively indicate permanent magnets mounted on the fixing members 32A through 32D, including the above fixing member 32A and 32D, for generating a magnetic field. In other words, the focusing coil 23 and tracking coils 24A and 24B are located within the magnetic field generated by the permanent magnets 27A through 27D. Further, numeral 28 indicates a reflecting plate for reflecting light transmitted from light transmitting elements included in a pair of optical sensors 29A and 29B, described later. The reflecting plate 28 is mounted on the bobbin 21, as shown at FIG. 4, in the opposite side surface as the surface on which the leaf springs 25A through 25D are connected. The reflecting plate 28 comprises, for example, a synthetic resin such as plastic, on which a multiplicity of irregularities are formed by means of a predetermined method such as a so-called closed die foging method for causing diffused reflection of the reflected light. Further, a pair of optical sensors 29A and 29B are provided opposite the reflecting plate 28. A differential operational amplifier 30 is provided for outputting signal in accordance with the difference between the outputs of the optical sensors 29A and 29B. As described above, since a multiplicity of irregularities are formed on the reflecting plate 28, the area in which reflected light reaches becomes wider as compared with the case in which the irregularities are not formed, and accordingly, the output level of the differential operational amplifier 30 is not undesirably varied even if a crack, chipped portion and so forth exists at the edge portions of the reflecting plate 28.

Figure 6:
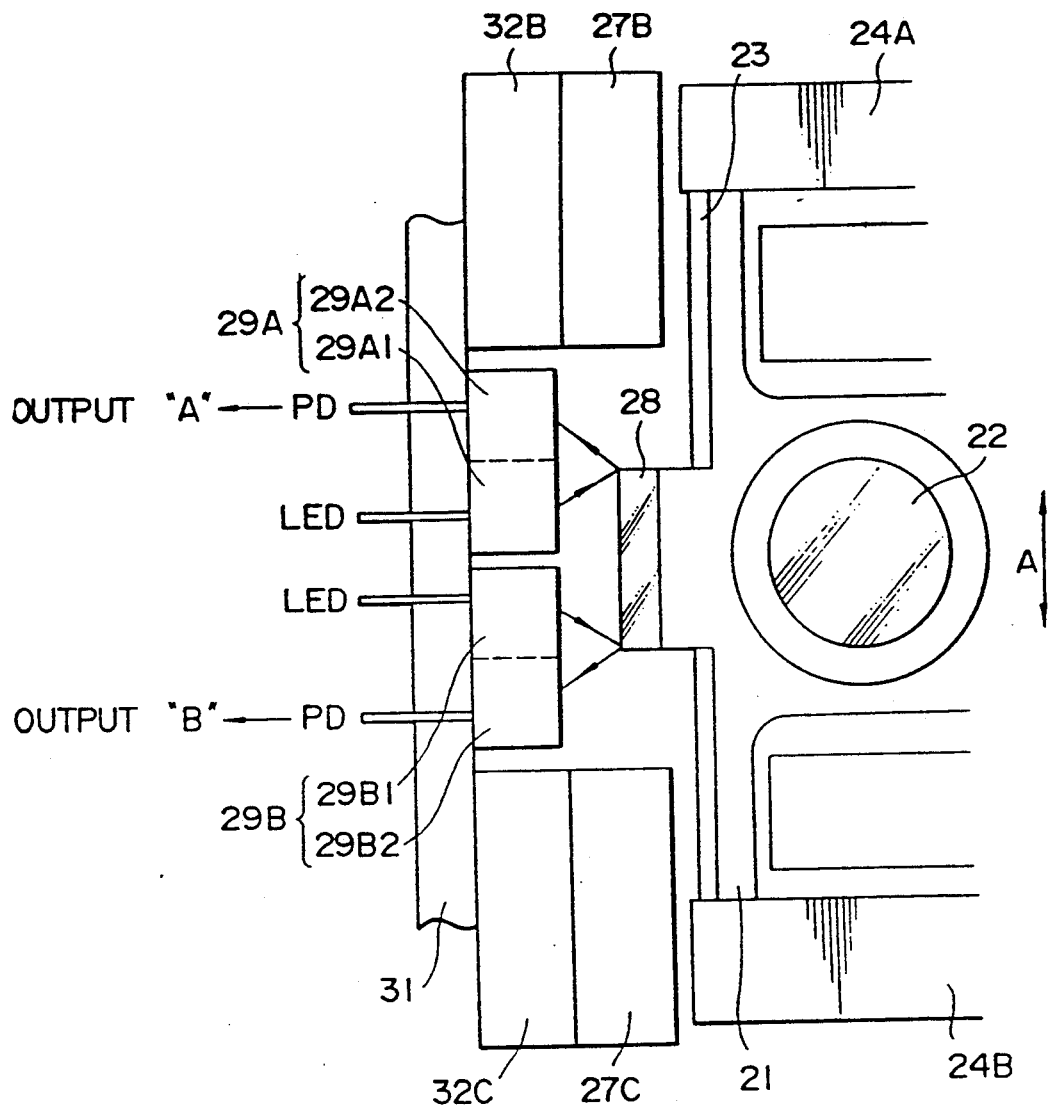
FIG. 6 is a partial enlarged view of FIG. 4 showing a portion at which a pair of optical sensor are mounted.

As illustrated in FIG. 6 showing a partial enlarged view of the FIG. 4, the pair of optical sensors 29A and 29B are mounted on a fixing section 31 which is fixed in the device, and respectively provide light transmitting elements 29A1 and 29B1 such as LED (Light Emitting Diodes) and light receiving elements 29A2 and 29B2 such as photodiode. The light transmitted from the light transmitting elements 29A1 and 29B1 respectively illuminate edge portions of the reflecting plate 28 as shown in FIG. 6.

In the above structured optical head 100 according to the present invention, when a signal caused by a moving error of the optical head 100 along a focusing direction, i.e., "B1-B2" direction, is supplied to the focusing coil 23, moving force is generated along the "B1-B2" direction in accord with Fleming's left hand rule since the focusing coil 23 is located in the magnetic field generated by the permanent magnets 7A and 7B. Accordingly, the leaf springs 25A and 25B are deformed, and then, the optical head 100 can be moved along the "B1-B2" direction. On the other hand, when a signal caused by a moving error of the optical head 100 along a tracking direction, i.e., "A" direction, is supplied to the tracking coil 24A and 24B, moving force is generated along the "A" direction in accord with Fleming's left hand rule, and then, the optical head 100 can be moved along the "A" direction. When the optical head 100 is upwardly moved in the drawing of FIG. 4, the amount of the light reflected by the reflecting plate 28 transmitted from the light transmitting element 29A1 is increased, therefore, the amount of light received by the light receiving element 29A2 is increased. In this case, the amount of light received by the light receiving element 29B2 is decreased. On the contrary, when the optical head 100 is moved downwardly in the drawing, the amount of light received by the light receiving element 29B2 is increased, and the amount of light received by the light receiving element 29A2 is decreased. Accordingly, by detecting the difference between the outputs "A" and "B" which are respectively outputted from these light receiving elements 29A2 and 29B2, and respectively correspond to the amounts of the received light, it becomes possible to determine the position of the optical head 100 in the "A" direction, i.e., the tracking direction. Further, it becomes possible to control the position of the optical head 100 along the tracking direction by means of the output signal of the differential operational amplifier 30 which is arranged, as described above, so as to output the signal in accordance with the difference between the output from the optical sensors 29A and 29B.

Figure 7:
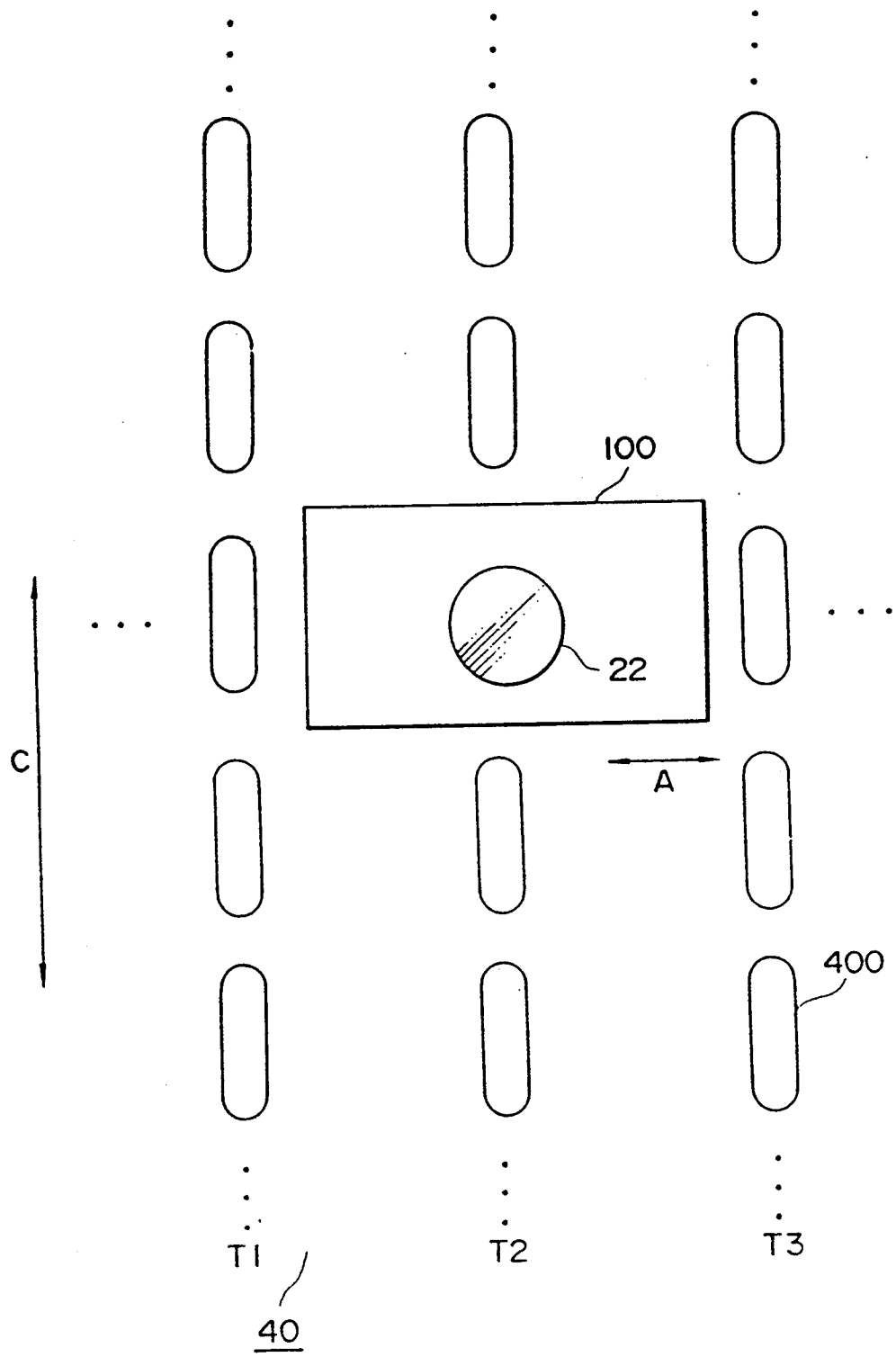
FIG. 7 is a view showing a positional relationship between the optical head according to the present invention and a recording medium for storing data to be read by the optical head.

By employing the above constructed optical head 100 in the device such as an optical video-disk device, a compact disk device and so forth, light emitted from a light source, not shown, is passed through the objective lens 22, and data is read from a predetermined recording medium such as a compact disk in accordance with the light. Further, as shown in FIG. 7, a recording medium 40 such as a disk, on which a plurality of tracks, which for example T1-T3, respectively comprise a multiplicity of pits 400 respectively corresponding to the stored data are arranged, is located below the optical head 100 and moved relative to the optical head 100 along a direction indicated by an arrow "C" by means of a predetermined driving source, not shown. In other words, the optical head 100 traces the desired track as the disk 40 is moved. During the above tracing operation, the optical head is located at the desired position in the tracking direction, i.e., in the "A" direction by means of the above described process. In other words, the optical head is controlled so as to be located at the desired position even if it is undesirably moved in the "A" direction.

When a carriage, not shown, for mounting the optical head 100 is moved in a radial direction of the disk 40, i.e., the tracking direction, at high speed, the undesirable deviation of the optical head from the desired position may be occurred by so-called inertia. In other words, when the carriage is moved to a certain position in the radial direction of the disk 40 at high speed, the optical head 100 on the carriage is undesirably moved in the radial direction by the inertia thereof. This means that a delay occurs before the optical head 100 is completely located at the desired position. In order to solve this problem, an amount and direction of the deviation of the optical head 100 is optically detected, and the optical head 100 is controlled so as in be moved to the opposite radial direction by means of a moving force generated by reversed phase current flowing through the tracking coils 24A and 24B. The outputs "A" and "B" of the light sensors, based upon the above deviation, are respectively inputted to the differential operational amplifier 30, and the differential operational amplifier 30 outputs a signal in accordance with the input signal. Then, a reversed phase current flows through the tracking coils 24A and 24B. Therefore, it becomes possible to control the optical head 100, i.e., to drive it in the opposite direction in accordance with the output signal of the differential operational amplifier 30.

Figure 8:
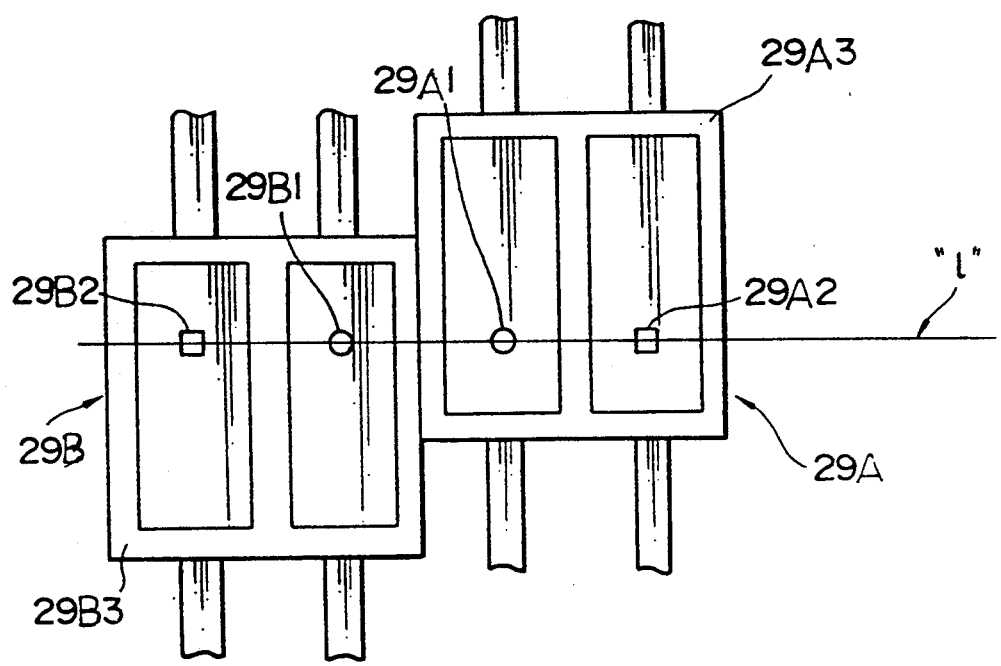
FIG. 8 is a view showing one example of an arrangement of the optical sensors.
Figure 9:
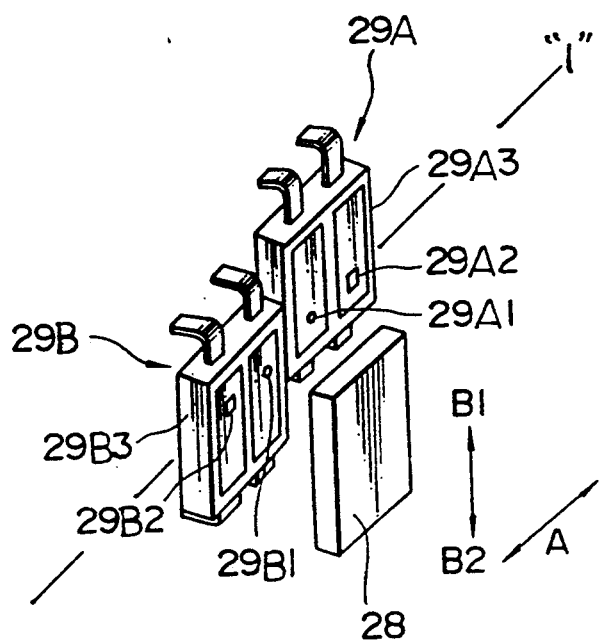
FIG. 9 is a perspective view of the arrangement shown in FIG. 8.
Figure 10:
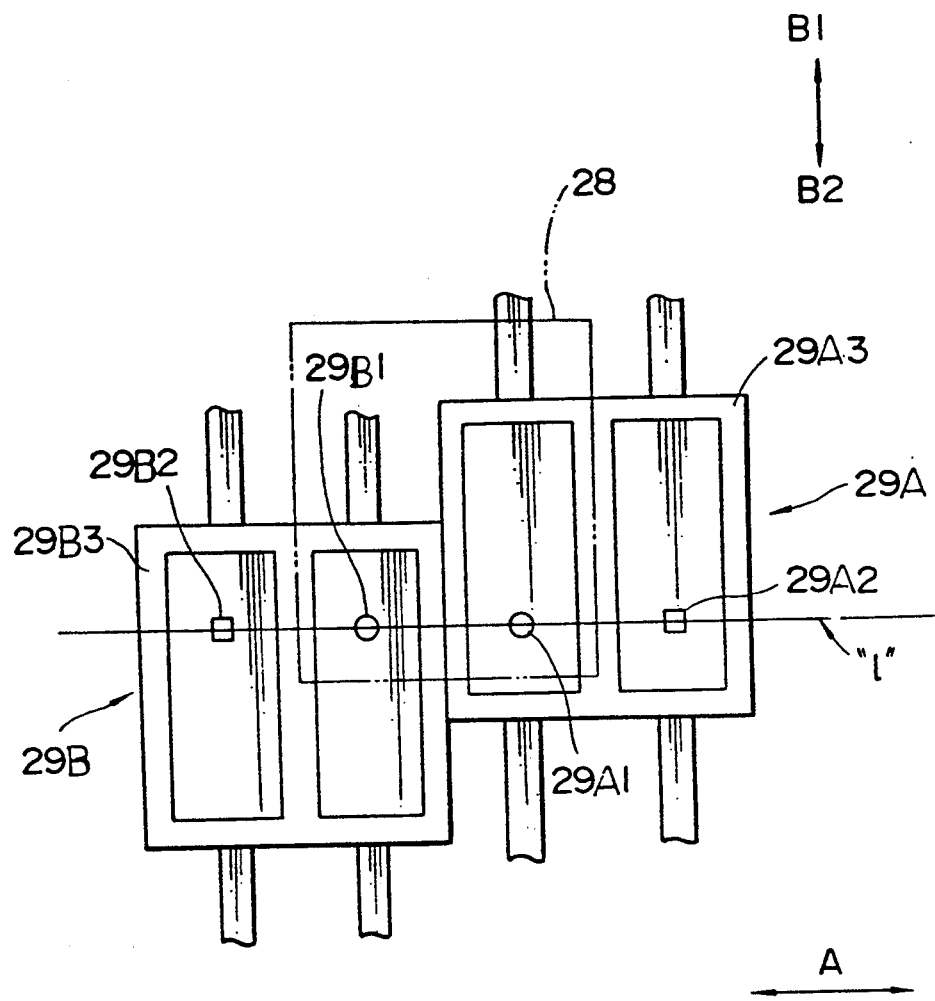
FIG. 10 is a view showing operation of the optical sensors shown in FIG. 8.

In the optical head according to the present invention, the optical sensors 29A and 29B are constructed in such a manner that, as shown in FIGS. 8 and 9, each of light transmitting elements 29A1, 29B1 and light receiving elements 29A2 and 29B2 are arranged in a row along a predetermined line "1" in parallel to the "A" direction, i.e., the tracking direction. Consequently, as shown in FIG. 10, the amount of light received by the light receiving elements 29A2 and 29B2 are not varied, even when the reflecting plate 28 is moved in "B1-B2" direction, i.e., focusing direction, and accordingly, the position of the optical head 100 along the "A" direction is not erroneously detected.

Figure 11:
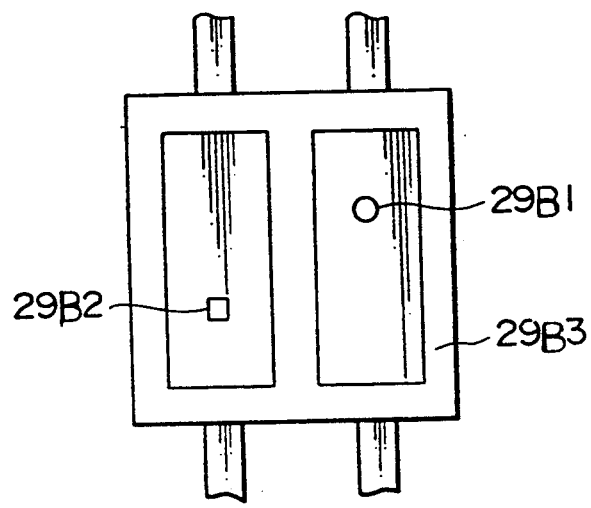
FIG. 11 is an enlarged view of another optical sensor.
Figure 12:
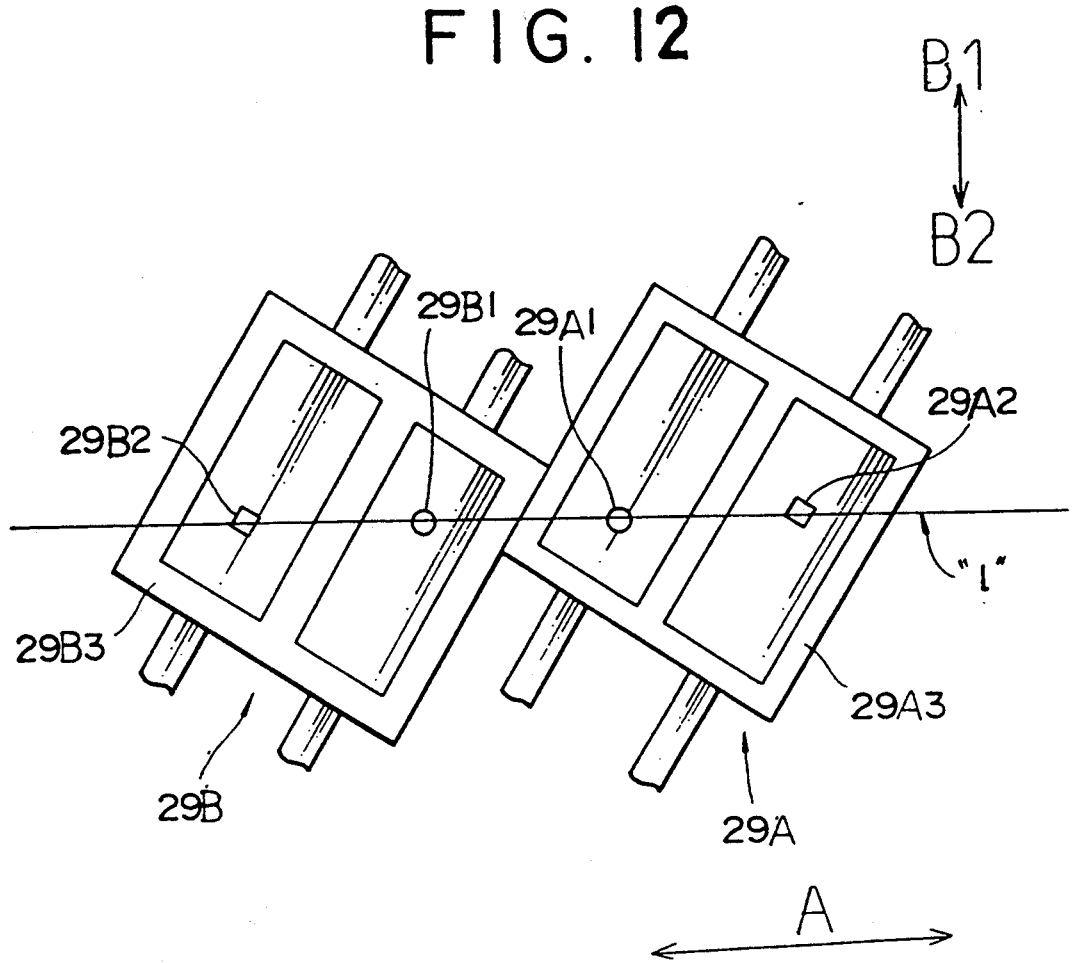
FIG. 12 is a view showing another example of an arrangement of the optical sensors shown in FIG. 11.

FIG. 11 shows a view of another optical sensor employable in the optical head according to the present invention. In this optical sensor, the light transmitting element 29B1 and the light receiving element 29B2 are arranged to be deviated with respect to each other, as shown in FIG. 11. When the optical sensor of FIG. 11 is used, these optical sensors 29A and 29B are constructed in such a manner that, as shown in FIG. 12, each of elements 29A1, 29A2, 29B1 and 29B2 are arranged in a row along a line "1" in parallel to the tracking direction. By employing the above arrangement, the amount of light received by the light receiving elements 29A2 and 29B2 are not varied even when the reflecting plate 28 is moved in "B1-B2" direction, i.e., focusing direction, and accordingly, the position of the optical head 100 along the "A" direction is not erroneously detected. Further, as shown in FIG. 10, it becomes possible to make the length of the reflecting plate 28 in the focusing direction shorter as compared with the reflecting plate employed in the conventional optical head.

As described above, in the present invention, the light transmitting elements and the light receiving elements included in the optical head are arranged in a row along a predetermined line in parallel to the tracking direction. Therefore, the position of the optical head along the tracking direction is not erroneously detected.

What is claimed is:

1. In a position detecting mechanism, adapted to be positioned in a device having a predetermined member arranged to be movable at least in one direction, for detecting the position of said predetermined member in said direction, comprising a pair of light transmitting means for transmitting light toward said predetermined member, reflecting means, provided on said predetermined member and extending along said direction for a predetermined length, for reflecting the light transmitted from said pair of light transmitting means, at the edge portions of said reflecting means along said direction, and a pair of light receiving means for receiving the light reflected by said reflecting means and outputting signals corresponding to the amounts of light received by said light receiving means, wherein
said pair of light transmitting means and said pair of light receiving means are arranged in a row along said direction.

2. The mechanism according to claim 1, wherein said pair of light transmitting means and said pair of light receiving means are further arranged along a predetermined line parallel to said direction.

3. The mechanism according to claim 1, wherein said pair of light transmitting means comprise light emitting diodes and said pair of light receiving means comprise photo diodes.

4. The mechanism according to claim 1, which further comprises performing means for calculating a subtraction between the amounts of light received by each one of said pair of light receiving means.

5. The mechanism according to claim 4, wherein said calculating means comprises a differential operational amplifier arranged so as to receive input signals corresponding to the amounts of light received by each one of said pair of light receiving means and to output a signal corresponding to the difference between said amounts of light.

6. A position controlling mechanism, adapted to be positioned in a device having an optical head arranged to be movable at least in one direction, for detecting the position of said optical head in said direction, comprising:

a pair of light transmitting means for transmitting light toward said optical head;

reflecting means, provided on said optical head, extending along said direction in a predetermined length, for reflecting the light transmitted from said pair of light transmitting means at the edge portions of said reflecting means along said direction, a surface of said reflecting means being arranged to cause diffused reflection;

a pair of light receiving means for receiving the light reflected by said reflecting means and outputting signals corresponding to the amount of light received by said light receiving means, said pair of light transmitting means and said pair of light receiving means being arranged in a row along a predetermined line parallel to said direction; and calculating means for performing a subtraction between the amounts of light received by each one of said pair of light receiving means.

7. The mechanism according to claim 6, wherein said pair of light transmitting means comprise light emitting diodes and said pair of light receiving means comprise photo diodes.

* * * * *